United States Patent
Lee (10) Patent No.: US 11,343,891 B2
(45) Date of Patent: May 24, 2022

(54) LED SYSTEM FOR VEHICLE LIGHTING HAVING HIGH EFFICIENCY AND HIGH RELIABILITY

(71) Applicant: Kyoungyeon Lee, Suwon-si (KR)

(72) Inventor: Kyoungyeon Lee, Suwon-si (KR)

( * ) Notice: Subject to any disclaimer, the term of this patent is extended or adjusted under 35 U.S.C. 154(b) by 0 days.

(21) Appl. No.: 17/429,142

(22) PCT Filed: May 27, 2020

(86) PCT No.: PCT/KR2020/006811
§ 371 (c)(1),
(2) Date: Aug. 6, 2021

(87) PCT Pub. No.: WO2021/117990
PCT Pub. Date: Jun. 17, 2021

(65) Prior Publication Data
US 2022/0086983 A1    Mar. 17, 2022

(30) Foreign Application Priority Data

Dec. 9, 2019    (KR) .......................... 10-2019-0162392

(51) Int. Cl.
*H05B 45/30*    (2020.01)
*H05B 45/345*    (2020.01)
(Continued)

(52) U.S. Cl.
CPC .......... *H05B 45/345* (2020.01); *F21S 41/141* (2018.01); *H05B 45/18* (2020.01)

(58) Field of Classification Search
CPC ...... H05B 45/38; H05B 45/46; H05B 45/325; H05B 45/345; H05B 45/375; H05B 45/3725

See application file for complete search history.

(56) References Cited

U.S. PATENT DOCUMENTS 9,173,265 B2    10/2015    Park et al.
10,051,697 B2    8/2018    Gong et al.
(Continued)

FOREIGN PATENT DOCUMENTS

JP    2004-039288 A    2/2004
KR    10-2013-0104802 A    9/2013
(Continued)

*Primary Examiner* — Tung X Le
(74) *Attorney, Agent, or Firm* — Rabin & Berdo, P.C.

(57) ABSTRACT

Provided is an LED system for vehicle lighting, the LED system including: an LED package (10) including a first LED chip (11) and a second LED chip (12); and an external transistor (20) provided outside the LED package (10), and connected to a main current channel of the LED package (10) in series, wherein the driving circuit (13) is configured to drive only the first LED chip (11) with a first constant current when a level of an input voltage is lower than that of a reference voltage, or drive the first LED chip (11), the second LED chip (12), and the external transistor (20) with a second constant current when the level of the input voltage is higher than that of the reference voltage, wherein the driving circuit (13) controls the first constant current and the second constant current such that power of the first LED chip (11) when only the first LED chip (11) is driven is the same as power of the first LED chip (11) and the second LED chip (12) when all the first LED chip (11), the second LED chip (12), and the external transistor (20) connected to each other in series are driven.

12 Claims, 8 Drawing Sheets

(51) Int. Cl.
*F21S 41/141* (2018.01)
*H05B 45/18* (2020.01)

(56) References Cited

U.S. PATENT DOCUMENTS

| | | | | |
|---|---|---|---|---|
| 2008/0012507 A1* | 1/2008 | Nalbant | ............ | H05B 45/3725 |
| | | | | 315/306 |
| 2013/0026923 A1* | 1/2013 | Athalye | ................ | H05B 45/48 |
| | | | | 315/113 |
| 2014/0232288 A1* | 8/2014 | Brandes | ................ | H05B 45/48 |
| | | | | 315/250 |
| 2015/0137700 A1* | 5/2015 | Evans | .................... | H05B 45/46 |
| | | | | 315/294 |
| 2019/0097533 A1* | 3/2019 | Kawata | ................. | H05B 47/25 |

FOREIGN PATENT DOCUMENTS

| KR | 10-2015-0070792 A | 6/2015 |
|---|---|---|
| KR | 10-2017-0111325 A | 10/2017 |
| KR | 10-2018-0044797 A | 5/2018 |

* cited by examiner

LED SYSTEM FOR VEHICLE LIGHTING HAVING HIGH EFFICIENCY AND HIGH RELIABILITY

TECHNICAL FIELD

The present disclosure relates to an LED system and a driving method thereof, the LED system having high reliability and efficiency even in an environment in which a change range of input voltages is wide, such as vehicle lighting.

BACKGROUND ART

Conventional driving methods of vehicle lighting may be roughly divided into two types.

The first method is a switching driving method using FETs, diodes, inductors, etc. The switching driving method is able to realize high efficiency and high reliability (driving stability, circuit temperature, etc.). However, the switching driving method has the problem of EMI, and is not generally used because the volumes of essential components used in this method are large and thus the total size of the circuit is large and the cost is high.

The second method is a constant-current driving method called a linear driving method. The constant-current driving method does not use components that have large volumes and are expensive, such as FETs, diodes, and inductors required in the switching driving method, so does not have the problem of EMI and is able to achieve realization in a smaller size than the switching driving method. However, in the case of the linear driving method, the driving stability decreases rapidly according to an input voltage range, and the reliability of the circuit according to temperature is low.

In the linear driving method, in an input voltage Vin range of 7 V to 24 V, which is a driving range for general vehicle lighting, a range in which constant-current driving is not achieved occurs depending on the number of LEDs. For example, usually in the case of a system using three general 3-Vf LEDs, constant-current driving is achieved at 9 V or higher, so normal constant-current driving is not achieved in a range of 7 V to 9 V.

In addition, in a system using one/two general 3-Vf LEDs, normal constant-current driving is achieved in a low voltage range of 7 V to 9 V, but under the condition of a high input voltage, for example, 20 V or higher, the constant current circuit has a heat problem and a reliability problem occurs consequently.

The power of the entire LED system may be expressed as follows.

$$P(\text{total}) = P(\text{heat distribution resistor}) + P(\text{total LED}) + P(\text{driving circuit})$$

The expression P (total LED) denotes the power consumed by all the LEDs, the expression P (heat distribution resistor) denotes the power consumed by a resistor provided for heat distribution, and the expression P (driving circuit) is the power consumed by a driving circuit. However, in an LED system using the linear driving method in the related art, as an input voltage increases, the power, that is, the P(driving circuit) value, applied to the driving circuit inevitably continues to increase. Then, in the LED system using the linear driving method in the related art, the heat problem occurs and the reliability problem occurs, or the size of the driving circuit needs to be large to withstand higher power so as to secure reliability (in general, a driving circuit uses an IC, so the IC PKG size is large).

In the meantime, the power applied to a heat distribution resistor may be increased to reduce the size (IC PKG size) of the driving circuit, but in order to display the same LED brightness, since the LED current is constant, as the power applied to the heat distribution resistor is increased, the voltage applied to the heat distribution resistor is increased, unfortunately. This means that even though an LED system using one/two general 3-Vf LEDs is used, normal driving may not be achieved even in a low voltage range of 7 V to 9 V or at 9 V because of the voltage drop across a heat distribution resistor.

Considering the form in which a driving circuit is included in an LED PKG, P(total LED) and P(driving circuit) are consumed in one LED PKG, so a more serious heat problem occurs in a high voltage range than in the form in which a driving circuit and an LED PKG are separated, thus worsening the reliability problem. Accordingly, in the form in which an LED driving circuit is included in an LED PKG, the number of components is reduced and the size of the entire system is reduced, but high LED power is not realized, unfortunately.

As described above, the conventional constant-current driving method (linear driving method) has a smaller size of an implementation circuit and lower cost than the switching driving method, but a heat problem occurs commonly, so the size of the constant-current driving circuit needs to be large although the size is smaller than that of the switching driving method. Thus, the cost of the constant-current driving circuit is high. That is, the PKG size of the IC needs to be large, and the size of the heat distribution resistor also needs to be large.

In addition, a high value is unable to be used as a value of the heat distribution resistor because of the problem that normal driving is impossible in the low voltage range.

DISCLOSURE

Technical Problem

Accordingly, the present disclosure has been made keeping in mind the above problems occurring in the related art, and the present disclosure is directed to providing an LED system for vehicle lighting, the LED system having high reliability and efficiency even in an environment in which a change range of input voltages is wide.

In addition, the present disclosure is directed to providing an LED system for vehicle lighting, the LED system being capable of lowering the cost by reducing the size of the driving circuit, of solving a heat problem which is the biggest problem in the related art, and of operating stably in a wide voltage range.

Technical Solution

According to one aspect of the present disclosure, there is provided an LED system for vehicle lighting, the LED system including: an LED package (10) configured to include a first LED chip (11) and a second LED chip (12) connected to each other in series, and a driving circuit (13) for controlling driving of the first LED chip (11) and the second LED chip (12); and an external transistor (20) provided outside the LED package (10), and connected to the first LED chip (11) and the second LED chip (12) through a terminal of the LED package (10), the external transistor (20) having a main current channel connected to the first LED chip (11) and the second LED chip (12) in series, wherein the driving circuit (13) is configured to drive only the first LED chip (11) with a first constant current when a level of an input voltage is lower than that of a reference voltage, or drive the first LED chip (11), the second LED chip (12), and the external transistor (20) with a second constant current when the level of the input voltage is higher than that of the reference voltage, wherein the driving circuit (13) controls the first constant current and the second constant current such that power of the first LED chip (11) when only the first LED chip (11) is driven is the same as power of the first LED chip (11) and the second LED chip (12) when all the first LED chip (11), the second LED chip (12), and the external transistor (20) connected to each other in series are driven.

The LED system for vehicle lighting may further include a current sensing resistor (30) connected to the main current channel of the external transistor (20) in series, wherein the driving circuit may receive a voltage applied to the current sensing resistor (30) through a terminal of the LED package (10), and may control a gate of the external transistor (20) by using a result of comparing the voltage applied to the current sensing resistor (30) and a voltage set by the driving circuit according to determination of the second constant current.

In the LED system for vehicle lighting, the driving circuit (13) may include a first FET (132) of which a drain is connected to a node to which the first LED chip (11) and the second LED chip (12) are connected, and of which a source is connected to ground, and the driving circuit (13) may be configured to control a gate of the first FET (132) such that the first constant current flows through the first FET (132) when the level of the input voltage is lower than that of the reference voltage, or control the gate of the first FET (132) such that the first FET (132) is turned off when the level of the input voltage is higher than that of the reference voltage.

The LED system for vehicle lighting may further include a current set resistor (40) provided outside the LED package (10), and connected to the driving circuit (13) through a terminal of the LED package (10), the current set resistor (40) setting the first constant current.

In the LED system for vehicle lighting, a current mirror circuit (M) connected to the gate of the first FET (132) may be provided including the current set resistor (40), wherein the current mirror circuit (M) may receive a control voltage from a controller (131) of the driving circuit (13), and may control a gate voltage of the first FET (132) such that a mirror current of a current flowing in the current set resistor (40) flows through the first FET (132).

The LED system for vehicle lighting may further include a temperature sensor (139) provided inside the LED package (10), and sensing a temperature of the LED package (10), wherein the driving circuit (13) may change the reference voltage according to a temperature value sensed by the temperature sensor (139), wherein as the temperature value increases, the reference voltage may be decreased.

According to another aspect of the present disclosure, there is provided an LED system for vehicle lighting, the LED system including: an LED package (10) configured to include a first LED chip (11) and a second LED chip (12) connected to each other in series, and a driving circuit (13) for controlling driving of the first LED chip (11) and the second LED chip (12); and a heat distribution resistor (50) provided outside the LED package (10), and having one end connected to the first LED chip (11) and the second LED chip (12) in series through a terminal of the LED package (10), wherein the driving circuit (13) is configured to perform driving such that a first constant current flows in a path going through the first LED chip (11) and to ground when a level of an input voltage is lower than that of a first reference voltage, perform driving such that a second constant current flows in a path going through the first LED chip (11) and the second LED chip (12) connected to each other in series, and to the ground when the level of the input voltage is higher than that of the first reference voltage and is lower than that of a second reference voltage, or perform driving such that the second constant current flows in a path going through the first LED chip (11), the second LED chip (12), and the heat distribution resistor (50) connected to each other in series when the level of the input voltage is higher than that of the second reference voltage.

In the LED system for vehicle lighting, the driving circuit (13) may perform control such that the following powers are the same: power of the first LED chip (11) when only the first LED chip (11) is driven; power of the first LED chip (11) and the second LED chip (12) when driving is performed in the path going through the first LED chip (11) and the second LED chip (12) connected to each other in series, and to the ground; and power of the first LED chip (11) and the second LED chip (12) when driving is performed in the path going through the first LED chip (11), the second LED chip (12), and the heat distribution resistor (50) connected to each other in series.

In the LED system for vehicle lighting, the driving circuit (13) may include: a first FET (141) of which a drain is connected to a node to which the first LED chip (11) and the first LED chip (12) are connected, and of which a source is connected to the ground; a second FET (142) of which a drain is connected to a node to which the second LED chip (12) and the heat distribution resistor (50) are connected, and of which a source is connected to the ground; and a third FET (143) of which a drain is connected to another end of the heat distribution resistor (50), and of which a source is connected to the ground, wherein the driving circuit (13) may be configured to perform control such that the first FET (141) and the third FET (143) are turned off and the second constant current flows through the second FET (142) when the level of the input voltage is higher than that of the first reference voltage and is lower than that of the second reference voltage, or perform control such that the first FET (141) and the second FET (142) are turned off and the second constant current flows through the third FET (143) when the level of the input voltage is higher than that of the second reference voltage.

The LED system for vehicle lighting may include: a first current set resistor (41) provided outside the LED package (10), and connected to the driving circuit (13) through a terminal of the LED package (10), the first current set resistor (41) setting the first constant current for the driving circuit (13); and a second current set resistor (42) provided outside the LED package (10), and connected to the driving circuit (13) through a terminal of the LED package (10), the second current set resistor (42) setting the second constant current for the driving circuit (13).

In the LED system for vehicle lighting, a first current mirror circuit (M1) connected to a gate of the first FET (141) may be provided including the first current set resistor (40), wherein the first current mirror circuit (M1) may receive a first control voltage from a controller (131) of the driving circuit (13), and may control a gate voltage of the first FET (141) such that a mirror current of a current flowing in the first current set resistor (41) flows through the first FET (141).

The LED system for vehicle lighting may further include a temperature sensor (139) provided inside the LED package (10), and sensing a temperature of the LED package (10), wherein the driving circuit (13) may change the first reference voltage and the second reference voltage according to a temperature value sensed by the temperature sensor (139), wherein as the temperature value increases, the first reference voltage and the second reference voltage may be decreased.

Advantageous Effects

The LED system for vehicle lighting according to the present disclosure solves the problems of the conventional driving method, and thus can have high reliability and efficiency even in an environment in which a change range of input voltages is wide.

In addition, the LED system for vehicle lighting according to the present disclosure can lower the cost by reducing the size of the driving circuit, can solve a heat problem which is the biggest problem in the related art, and can operate stably in a wide voltage range.

In addition, the LED system for vehicle lighting according to the present disclosure can reduce the number of components and the circuit area, and can maintain the power of all the LEDs despite the entire input voltage range and time change, so that the same quantity of light can be maintained in one LED PKG despite the entire input voltage and time change.

DESCRIPTION OF DRAWINGS

FIG. 1 illustrates an LED package included in an LED system for vehicle lighting according to a first embodiment of the present disclosure, wherein FIG. 1(a) is a diagram illustrating the exterior of the LED package and FIG. 1(b) is a diagram illustrating a main configuration inside the LED package.

FIG. 5 illustrates graphs of electrical characteristics of an LED system for vehicle lighting according to an embodiment of the present disclosure, wherein FIG. 5(a) illustrates the current characteristic according to the input voltage and FIG. 5(b) illustrates the power characteristic according to the input voltage.

FIG. 7 illustrates graphs of electrical characteristics of an LED system for vehicle lighting according to the second embodiment of the present disclosure, wherein FIG. 7(a) illustrates the current characteristic according to the input voltage and FIG. 7(b) illustrates the power characteristic according to the input voltage.

BEST MODE

Figure 1:
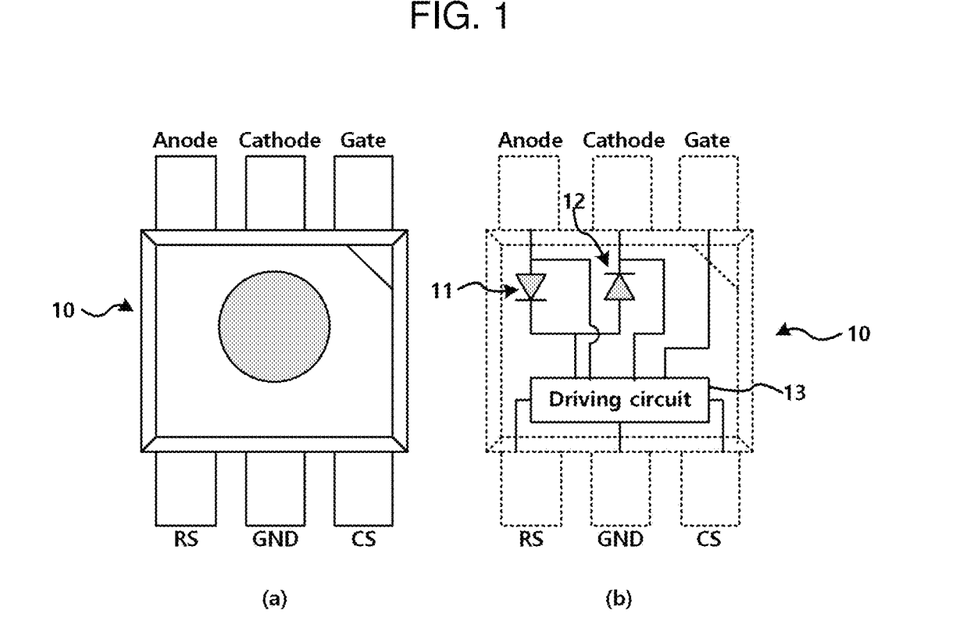

FIG. 1 illustrates an LED package included in an LED system for vehicle lighting according to a first embodiment of the present disclosure, wherein FIG. 1(a) is a diagram illustrating the exterior of the LED package and FIG. 1(b) is a diagram illustrating a main configuration inside the LED package.

Figure 2:
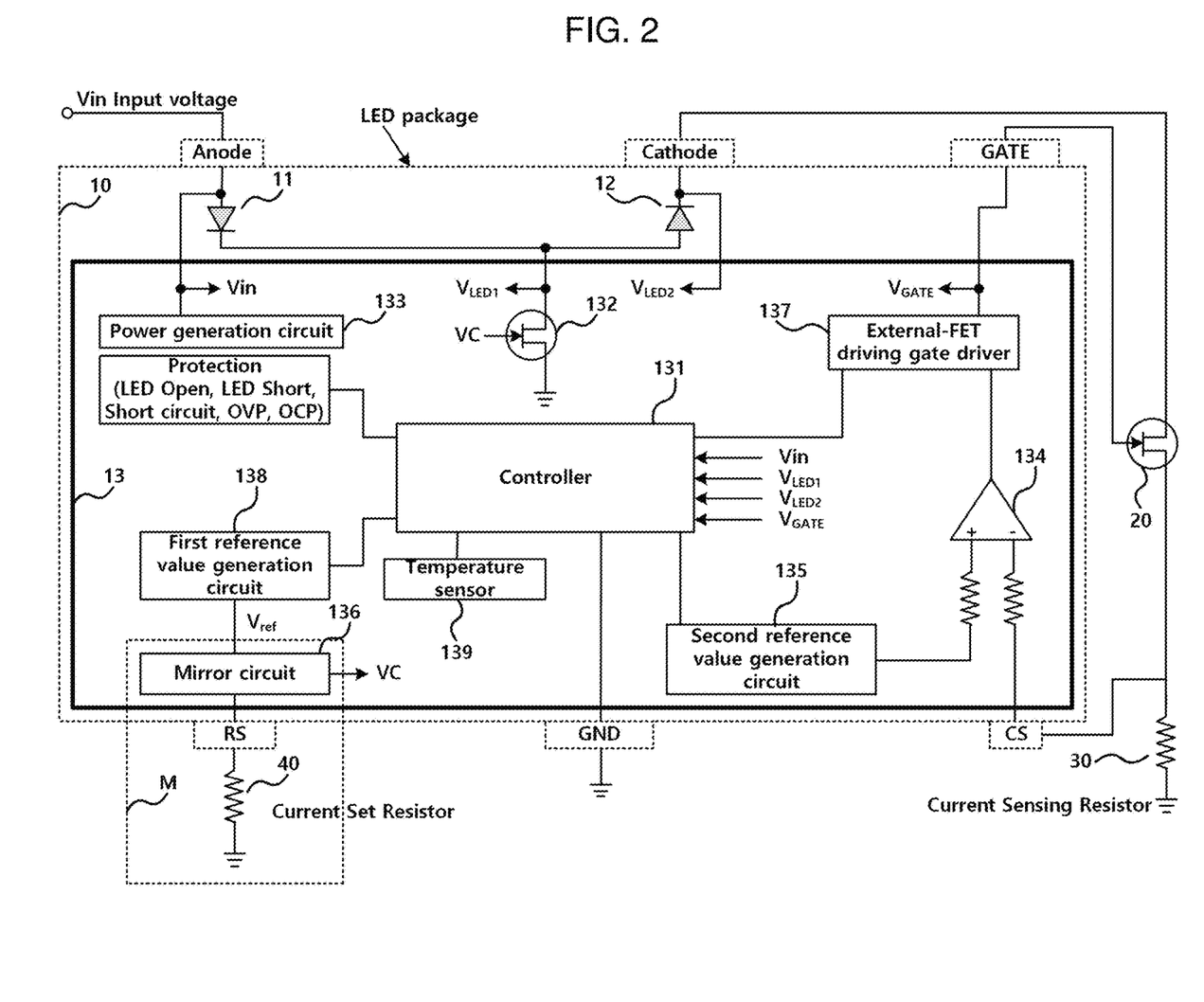
FIG. 2 is a functional block diagram illustrating a main configuration of an LED system for vehicle lighting according to the first embodiment of the present disclosure.

FIG. 2 is a functional block diagram illustrating a main configuration of an LED system for vehicle lighting according to the first embodiment of the present disclosure.

The LED system for vehicle lighting according to the first embodiment of the present disclosure schematically includes an LED package 10, an external transistor 20, a current sensing resistor 30, and a current set resistor 40. The LED package 10 includes a first LED chip 11 (hereinafter, also referred to as an "LED1") and a second LED chip 12 (hereinafter, also referred to as an "LED2") connected to each other in series, and a driving circuit 13. The embodiments of the present disclosure have a form in which LED chips and a driving circuit are provided together in a single package. An anode of the first LED chip 11 receives an input voltage Vin through an anode terminal of the LED package. A cathode of the first LED chip 11 is connected to an anode of the second LED chip 12. A cathode of the second LED chip 12 is connected to the external transistor 20 through a cathode terminal of the LED package.

The fundamental form of the system includes: an LED package including at least two LED chips and a driving circuit 13 for high efficiency/high reliability; and an external transistor 20 that functions as a heat distribution resistor in the related art.

The external transistor 20 may be a field-effect transistor (FET), a bipolar transistor, or an insulated-gate bipolar mode transistor (IGBT). Typically, a FET is preferred. Outside the LED package 10, the external transistor 20 is connected to the first LED chip 11 and the second LED chip 12 through a terminal (cathode) of the LED package 10. The external transistor 20 has one end connected to the cathode of the second LED chip 12, and another end connected to the current sensing resistor 3, so that a primary current channel (hereinafter, also referred to as a "main current channel", or refers to a drain-source path in the case of a FET) of the external transistor is connected to the first LED chip 11 and the second LED chip 12 in series. A gate of the external transistor 20 is connected to the driving circuit 13 and receives a control signal of the driving circuit 13.

The driving circuit 13 is for controlling the driving of the first LED chip 11 and the second LED chip 12, and the operation of the external transistor 20. When the level of an input voltage is lower than that of a reference voltage, the driving circuit 13 drives only the first LED chip 11 with a first constant current among the first LED chip 11 and the second LED chip 12 connected to each other in series. When the level of the input voltage is higher than that of the reference voltage, the driving circuit 13 drives the first LED chip 11 and the second LED chip 12 with a second constant current. The driving circuit 13 controls the first constant current and the second constant current such that the power of the first LED chip 11 when only the first LED chip 11 is driven is the same as the power of the first LED chip 11 and the second LED chip 12 when all the first LED chip 11 and the second LED chip 12 connected to each other in series are driven.

The function of the driving circuit 13 for high efficiency/high reliability is to keep the power of all LED chips constant even though the form of driving two LED chips is switched (for example, only the LED1 is driven; or the LED1, the LED2, and the FET are simultaneously driven). The driving circuit 13 switches the driving of the LED chips such that the LED total power remains the same even when the input voltage is changed, and controls the external transistor 20, which functions as a conventional heat distribution resistor, so as to lower the heat of the LEDs even at a high input voltage. Further, the driving circuit 13 has a protection function and a function of switching between the driving of the LED1 and the driving of the LED1, the LED2, and the FET, through detection of the temperature of the driving circuit.

The current sensing resistor 30 has one end connected to the main current channel of the external transistor 20 in series, and another end connected to the ground, and performs the function of sensing the current of the path through the LED1, the LED2, and the external transistor. Specifically, the current sensing resistor 30 provides a voltage signal to a comparator 134 of the driving circuit 13 through a terminal (CS) of the LED package, wherein the voltage signal is acquired by multiplying the current flowing in the current sensing resistor and the resistance.

Outside the LED package 10, the current set resistor 40 is connected to the driving circuit 13 through a terminal (RS) of the LED package 10. The current set resistor 40 and a part of the driving circuit constitute a current mirror circuit M, and the current set resistor 40 is used to set the first constant current.

The driving circuit 13 includes: a power generation circuit 133 for supplying power to each part of the driving circuit; a first FET 132 having a drain connected to a node to which the first LED chip 11 and the second LED chip 12 are connected, and having a source connected to the ground; a first reference value generation circuit 138 for providing a first control voltage to the current mirror circuit M (specifically, a mirror circuit 136); a second reference value generation circuit 135 for providing a second control voltage to the comparator 134; the comparator 134 outputting a result of comparing the second control voltage from the second reference value generation circuit 135 and the voltage from the current sensing resistor 30; an external-transistor driving gate driver 137 applying a voltage for turning off the external transistor 20 to the gate of the external transistor 20 in a protection situation, or controlling a gate voltage of the external transistor 20 according to the output of the comparator 134, normally; a temperature sensor 139 sensing the temperature of the LED package 10; the mirror circuit 136, together with the current set resistor 40, constituting the current mirror circuit M; and a controller 131 receiving a voltage or a sensing signal from each part of the driving circuit, and controlling each part of the driving circuit.

The controller 131 receives the input voltage Vin, the voltage of the LED1 (specifically, the cathode voltage of the LED1) $V_{LED1}$, the voltage of the LED2 (specifically, the cathode voltage of the LED2) $V_{LED2}$, the gate voltage $V_{GATE}$ of the external transistor, and a sensing result signal of the temperature sensor, and controls each part of the driving circuit. The controller 131 provides information on a first comparison voltage to be set for the first reference value generation circuit 138, information on a second comparison voltage to be set for the second reference value generation circuit 135, and a control signal for the protection situation for the external-transistor driving gate driver 137, and performs calculation and control required therefor.

When the level of the input voltage is lower than that of the reference voltage, the driving circuit 13 controls a gate of the first FET 132 such that the first constant current flows through the first FET 132 and the driving circuit 13 controls the gate of the external transistor 20 such that no current flows in the path going through the second LED chip 12 and the external transistor 20. In addition, when the level of the input voltage is higher than that of the reference voltage, the driving circuit 13 controls the gate of the first FET 132 such that the first FET 132 is turned off and the driving circuit 13 controls the gate voltage of the external transistor 20 such that the second constant current flows through the first LED chip, the second LED chip, and the external transistor.

The driving circuit 13 receives the voltage applied to the current sensing resistor 30 through the terminal (CS) of the LED package 10, and controls the gate of the external transistor 20 by using a result of comparing the voltage applied to the current sensing resistor 30 and the voltage set by the driving circuit according to the determination of the second constant current, thereby enabling the second constant current to flow through the external transistor.

At a low input voltage (for example, equal to or lower than the reference voltage), a basic constant current set value of the LED1 is set through an external resistor (current set resistor) at the RS terminal (pin) of the LED package and the LED1 is subjected to constant-current driving. When the input voltage increases and reaches a high voltage range (equal to or higher than the reference voltage) enabling the LED1 and the LED2 to be driven in series, the LED1, the LED2, and the external transistor are subjected to constant-current driving by an external resistor (current sensing resistor) at the CS terminal (pin) of the LED package.

Herein, in the high voltage range, the power other than the driving power of both the LED1 and the LED2 is made to be applied to the external transistor, so that a wide driving range and heat stability are secured. In particular, since the external transistor is located outside the LED package, the heat of the external transistor does not affect the LED package. Accordingly, the LED1, the LED2, and the driving circuit provided inside the LED package are not affected, so that the operation reliability of the LED package (driving circuit) is secured. In the high voltage range, the external transistor is made to consume great power. Therefore, compared to the case in which a driving circuit of an LED package is made to share great power consumption, the LED package is realized in a smaller size. In addition, in a low voltage range, the driving current is made to flow through the path that does not go through the external transistor (and does not go through the LED2 also), so that driving is achieved at a lower input voltage (for example, a range of 5 V to 7 V) compared to the related art.

The current mirror circuit M includes the current set resistor 40 and the mirror circuit 136 so that the current mirror circuit M connected to the gate of the first FET 132 is provided. The current mirror circuit M receives a control voltage from the controller 131 of the driving circuit 13. Specifically, the controller 131 may provide control voltage information to the first reference value generation circuit 138 so that the first reference value generation circuit 138 outputs the control voltage. In addition, the current mirror circuit M controls the gate voltage of the first FET 132 such that the mirror current of the current flowing in the current set resistor 40 flows through the first FET 132.

Figure 3:
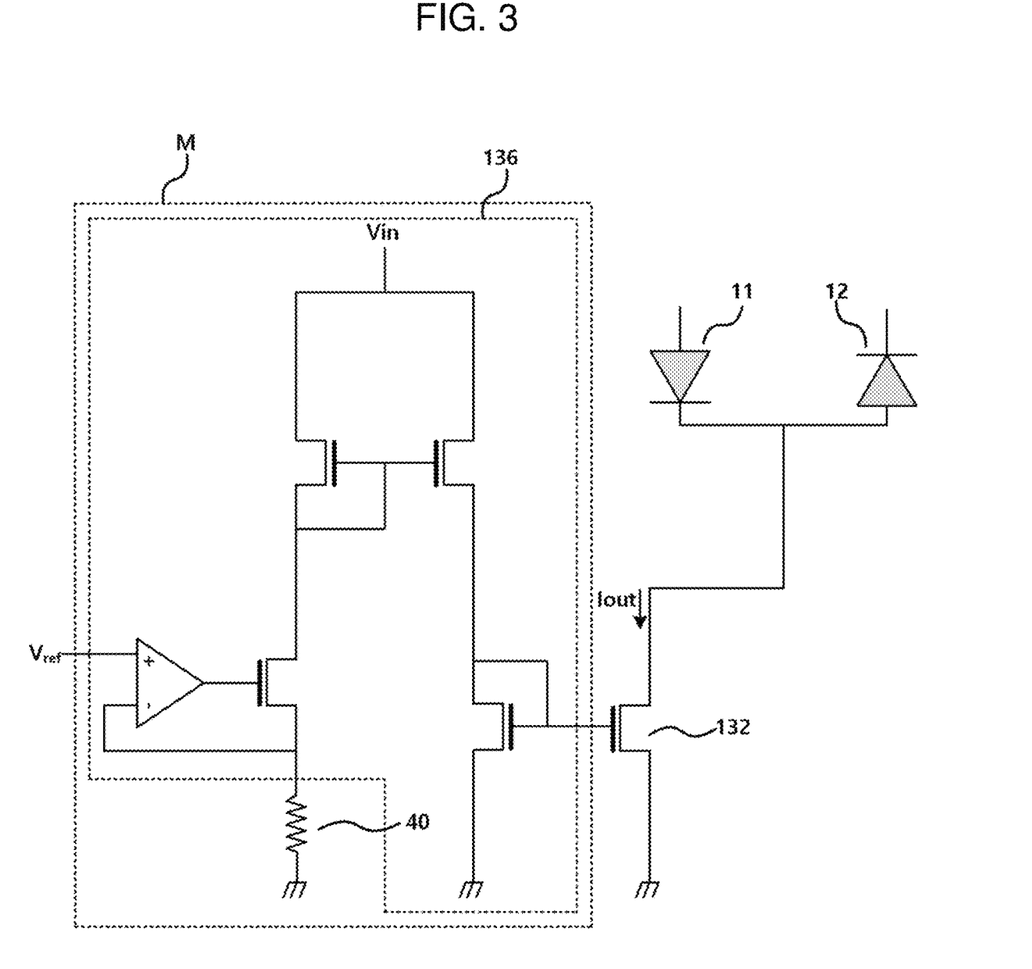
FIG. 3 is a circuit diagram illustrating an example of a current mirror circuit M applicable to an embodiment of the present disclosure.

FIG. 3 is a circuit diagram illustrating an example of a current mirror circuit M applicable to an embodiment of the present disclosure.

The current mirror circuit M shown in the example of FIG. 3 is a known technology, so a detailed description thereof will be omitted. However, a primary current flowing in the current set resistor RS is determined depending on a control voltage $V_{REF}$ ("first control voltage") input to the current mirror circuit M and the value of the current set resistor RS, and a secondary current $I_{OUT}$ (which becomes the "first constant current" described above) that is a fixed ratio of the primary current flows through the drain-source path of the first FET 132.

In the meantime, when the input voltage reaches the high voltage range, according to the control (control information) by the controller, the second reference value generation circuit 135 provides the second control voltage as a + input of the comparator 143. As the current flows through the current sensing resistor 30, the voltage applied to the current sensing resistor 30 is provided as a − input of the comparator 134, and the comparator 143 outputs a result of comparing the input voltages. According to the output of the comparator 143, the external-transistor driving gate driver 137 increases or decreases the gate voltage of the external transistor 20, thereby increasing or decreasing the current flowing in the external transistor 20. Such an increase or decrease in the current and the change of the voltage applied to the current sensing resistor accordingly are applied back to the input of the comparator, whereby a feedback loop is provided. According to such a feedback action, the voltage applied to the current sensing resistor converges to the second control voltage. As a result, with the current sensing resistance determined, a second driving current is determined by the second control voltage.

According to an embodiment of the present disclosure, in driving in the high voltage range, the current (second constant current) flows through the path that goes through the resistor (that is, the current sensing resistor), but in driving in the low voltage range, the current (first constant current) flows through the path that does not go through the resistor (that is, the current set resistor).

In driving in the high voltage range, the current sensing resistor functions as a heat distribution resistor a little and has a voltage distribution effect. Conversely, in driving in the low voltage range, the resistor is removed in the current path, so driving of the LED (LED1) is achieved even at a lower voltage.

Another feature of the present disclosure is varying the reference voltage according to the temperature of the LED package. The driving circuit 13 changes the reference voltage according to a temperature value sensed by the temperature sensor 139, wherein as the temperature value increases, the reference voltage is decreased. In the present disclosure, the reference voltage for division into the low voltage range and the high voltage range with respect to the input voltage is varied using the input of the temperature sensor. For example, in a normal temperature range, the reference voltage is set to 9 V, but when the temperature of the LED package increases to a predetermined temperature or above, the reference voltage is decreased to 8 V. This causes the driving of the LED1, the LED2, and the external FET to start at a lower reference voltage.

According to an embodiment of the present disclosure, in a control method for achieving the same power, each control voltage has a fixed value in accordance with the electrical characteristics of the LED1/LED2 in the LED PKG, and P1=P2 is achieved by setting an RS/CS resistance. In another control method, which is a method for realizing P1=P2 automatically by the internal driving circuit, when one constant current is determined, the other constant current is automatically determined. Herein, sensed voltage values may be used. For example, the first control voltage may be calculated from the second control voltage and the voltage values input to the controller.

Figure 4:
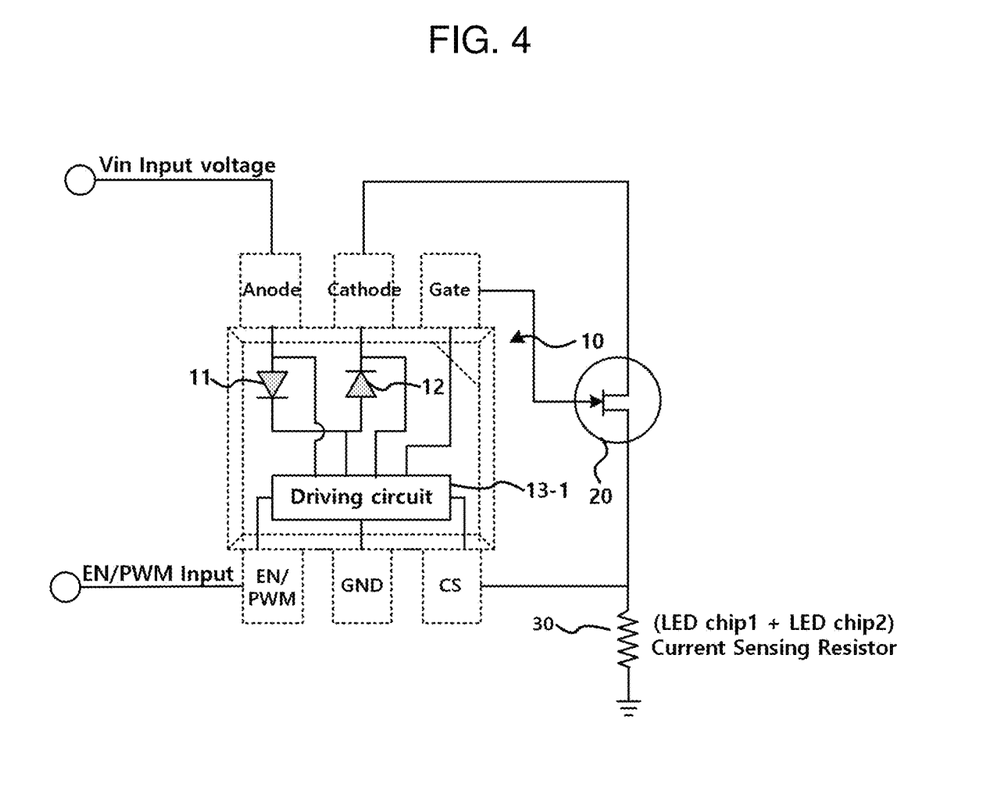
FIG. 4 is a block diagram illustrating an LED system for vehicle lighting according to a modification embodiment of the first embodiment.

FIG. 4 is a block diagram illustrating an LED system for vehicle lighting according to a modification embodiment of the first embodiment.

In the modification embodiment, there is no current set resistor, and an EN/PWM function is added. According to the first embodiment, in a low input voltage range, the basic constant current (first constant current) of the LED1 is set using the external resistor connected to the RS terminal of the LED package. However, according to the modification embodiment, a modification is made to set the basic constant current through internal fusing (not shown). For example, in such a method, multiple resistors are arranged in series/parallel or a resistor network is provided and then effective resistance that functions as the current set resistor described in the first embodiment is set through fusing and used.

In the meantime, in the modification embodiment, when the driving of the LED1 or the driving of the LED1 and the LED2 is performed upon input of an external EN/PWM signal, On/Off driving and PWM driving are performed, which is different from the first embodiment. Also herein, the LED total power in accordance with the EN/PWM signal is constant over the entire input voltage range, and driving with high efficiency and high reliability is performed in the same manner.

Figure 5:
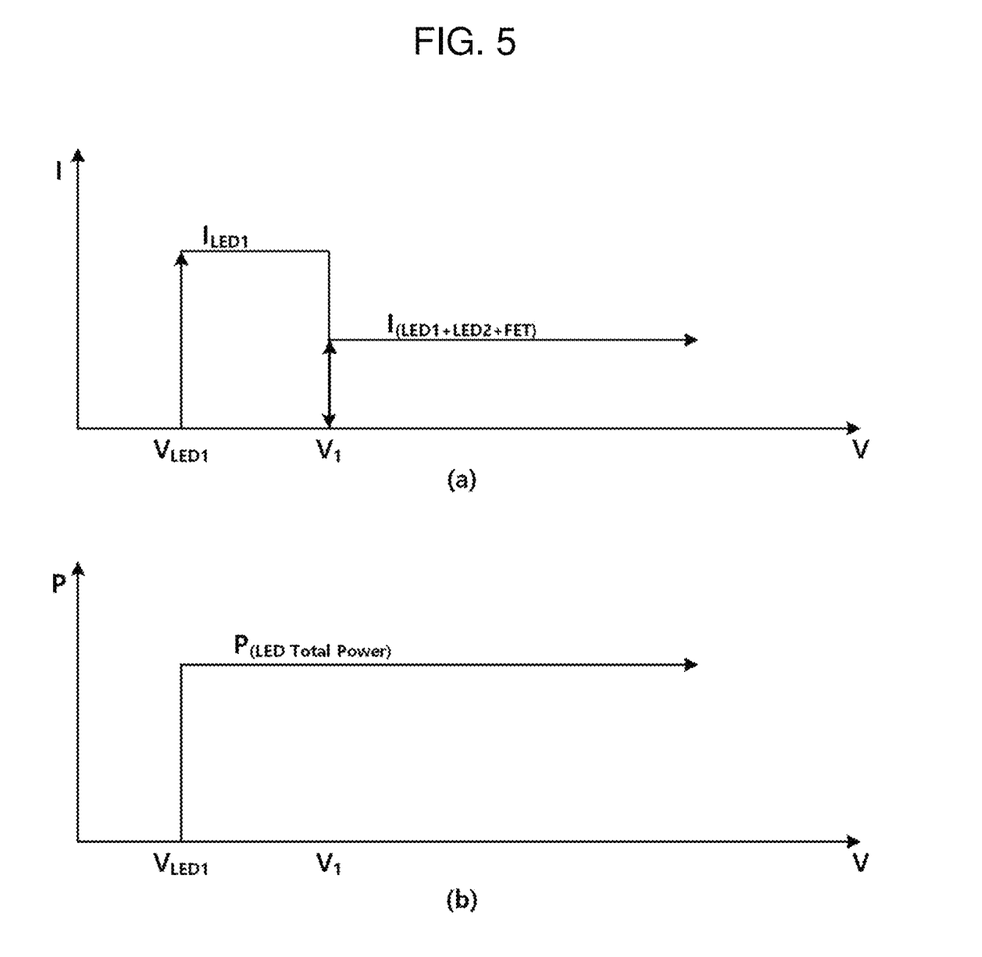

FIG. 5 illustrates graphs of electrical characteristics of an LED system for vehicle lighting according to an embodiment of the present disclosure, wherein FIG. 5(*a*) illustrates the current characteristic according to the input voltage and FIG. 5(*b*) illustrates the power characteristic according to the input voltage.

As shown in FIG. 5, when the input voltage is in an LED1 driving voltage range ($V_{LED1}$~$V_1$), only the LED1 is driven. When a higher voltage is applied and in a range ($V_1$~) also enabling the LED2 to be driven, constant-current driving is performed by the external transistor connected to the LED1 and the LED2 connected to each other in series. Herein, even though the input voltage is varied as the voltage of the LED1/LED2 is detected and the constant current set value is changed, the power [$P_{(LED\ Total\ Power)}$] of all the LEDs is made to be constant and the same quantity of light is maintained as shown in FIG. 5(*b*).

In the range enabling only the LED1 to be driven, the LED total power is made to be constant by the constant current $I_{LED1}$ flowing in the path that goes through the internal driving circuit. In the high voltage range, that is, the range also enabling the LED2 to be driven, other than the above-described range, the LED total power is made to be constant by the constant current ($I_{LED1+LED2+FET}$) flowing in the path that goes through the external transistor, so that the heat problem of the driving circuit in a high voltage input range is solved.

Through the driving of the external transistor, it is possible to remove the driving range limitation that is a problem of a heat distribution resistor in the related art. Accordingly, the driving voltage of the LED1 and the LED2 is able to be set to an LED Vf value enabling the maximum efficiency, and it is possible to realize a high reliability system having high efficiency and with a heat problem solved.

Figure 6:
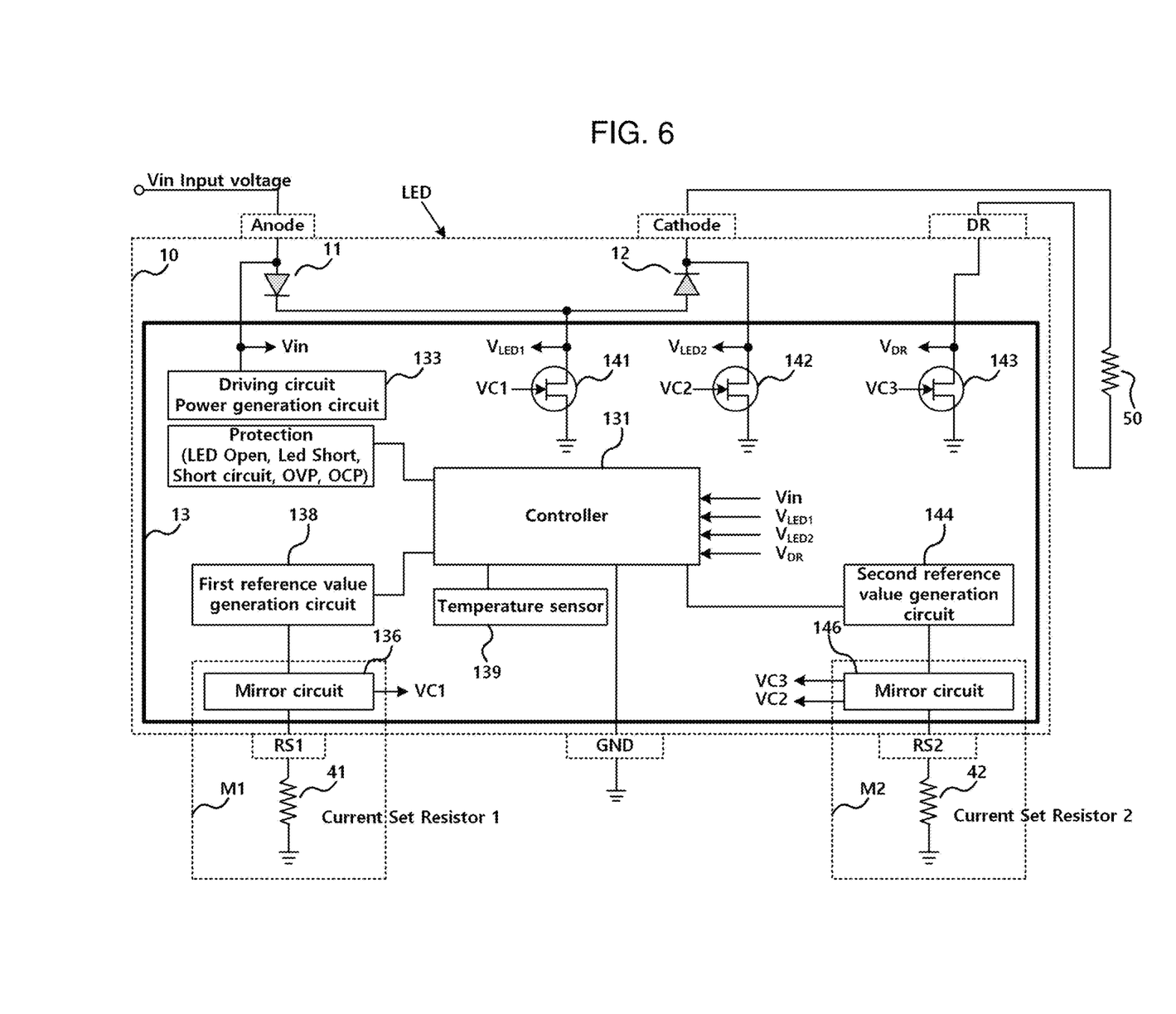
FIG. 6 is a diagram illustrating a main configuration of an LED system for vehicle lighting according to a second embodiment of the present disclosure.

FIG. 6 is a diagram illustrating a main configuration of an LED system for vehicle lighting according to a second embodiment of the present disclosure.

Hereinafter, compared to the first embodiment, different parts will be mainly described, and the same or similar contents will be omitted.

The LED system includes an LED package 10 and a heat distribution resistor 50 provided outside the LED package 10.

The LED package 10 includes: a first LED chip 11 and a second LED chip 12 connected to each other in series; and a driving circuit 13 for controlling driving of the first LED chip 11 and the second LED chip 12. Outside the LED package 10, the heat distribution resistor 50 has a first end connected to the first LED chip 11 and the second LED chip 12 in series through a terminal (cathode) of the LED package 10, and a second end connected to a terminal (DR) of the LED package 10. That is, the opposite ends of the heat distribution resistor are connected to the LED package.

When the level of the input voltage is lower than that of a first reference voltage (a first voltage range), the driving circuit 13 performs driving such that a first constant current flows in the path which goes through the first LED chip 11 and a first FET 141 and to the ground. When the level of the input voltage is higher than that of the first reference voltage and is lower than that of a second reference voltage (a second voltage range), the driving circuit 13 performs driving such that a second constant current flows in the path which goes through the first LED chip 11, the second LED chip 12, and a second FET 142 connected to each other in series, and to the ground. When the level of the input voltage is higher than that of the second reference voltage (a third voltage range), the driving circuit 13 performs driving such that the same second constant current (the same as the current for the second voltage range) flows in the path which goes through the first LED chip 11, the second LED chip 12, and the heat distribution resistor 50 connected to each other in series, and through a third FET 143.

The driving circuit 13 performs control such that the following powers are the same: the power of the first LED chip 11 when only the first LED chip 11 is driven (when the input voltage is in the first voltage range); the power of the first LED chip 11 and the second LED chip 12 when driving is performed in the path going through the first LED chip 11 and the second LED chip 12 connected to each other in series, and to the ground (when the input voltage is in the second voltage range); and the power of the first LED chip 11 and the second LED chip 12 when driving is performed in the path going through the first LED chip 11, the second LED chip 12, and the heat distribution resistor 50 connected to each other in series (when the input voltage is in the third voltage range).

The driving circuit 13 includes the first FET 141, the second FET 142, and the third FET 143. The driving circuit 13 includes: a power generation circuit 133 for supplying power to each part of the driving circuit; a temperature sensor 139 sensing the temperature of the LED package 10; and a controller 131 receiving a voltage or a sensing signal from each part of the driving circuit, and controlling each part of the driving circuit.

The first FET 141 has a drain connected to a node to which the first LED chip 11 and the second LED chip 12 are connected, and has a source connected to the ground. The gate voltage of the first FET 141 is controlled by a first current mirror circuit M1. The second FET 142 has a drain connected to a node to which the second LED chip 12 and the heat distribution resistor 50 are connected, and has a source connected to the ground. The gate voltage of the second FET 142 is controlled by a second current mirror circuit M2. The third FET 143 has a drain to which the second end of the heat distribution resistor 50 is connected, and has a source connected to the ground. The gate voltage of the third FET 143 is controlled by the second current mirror circuit M2.

When the level of the input voltage is lower than that of the first reference voltage (the first voltage range), the driving circuit 13 performs control such that the second FET 142 and the third FET 143 are turned off and the first constant current flows through the first FET 141. When the level of the input voltage is higher than that of the first reference voltage and is lower than that of the second reference voltage (the second voltage range), the driving circuit 13 performs control such that the first FET 141 and the third FET 143 are turned off and the second constant current flows through the second FET 142. When the level of the input voltage is higher than that of the second reference voltage (the third voltage range), the driving circuit 13 performs control such that the first FET 141 and the second FET 142 are turned off and the second constant current flows through the third FET 143.

Outside the LED package 10, a first current set resistor 41 is connected to the driving circuit 13 through a terminal (RS1) of the LED package 10, and sets the first constant current for the driving circuit 13. Outside the LED package 10, a second current set resistor 42 is connected to the driving circuit 13 through a terminal (RS2) of the LED package, and sets the second constant current for the driving circuit 13.

The first current mirror circuit M1 connected to the gate of the first FET 141 is provided including the first current set resistor 41. For example, the first current mirror circuit M1 may be provided in the same manner as the current mirror circuit M shown in FIG. 3. The first current mirror circuit M1 receives a first control voltage by the controller 131 of the driving circuit 13. For example, the controller 131 provides first control voltage information to the first reference value generation circuit 136, and the first reference value generation circuit 136 outputs the first control voltage. In addition, the first mirror circuit controls the gate voltage VC1 of the first FET 141 such that the mirror current of the current flowing in the first current set resistor 41 flows through the first FET 141.

The second current mirror circuit M2 connected to the gate of the second FET 142 and to the gate of the third FET 143 is provided including the second current set resistor 42. The second current mirror circuit M2 receives a control voltage from the controller 131 of the driving circuit 13. For example, the controller 131 provides second control voltage information to the second reference value generation circuit 144, and the second reference value generation circuit 144 outputs the second control voltage. The second mirror circuit controls the gate voltage of the second FET 142 and the gate voltage of the third FET 143 such that the mirror current of the current flowing in the second current set resistor 42 flows through the second FET 142 or the third FET 142, wherein the second FET 142 or the third FET 143 operates according to the voltage range. The current mirror circuit of this type may be, for example, a result of connecting the right-side circuit of the current mirror circuit shown in FIG. 3 in parallel with the same right-side circuit, or of connecting the gate of the second FET 142 and the gate of the third FET 143 in parallel. In the meantime, in order to operate either the second FET 142 or the third FET 143 selectively, a switching transistor may be placed on two parallel connection paths and selection may be performed according to the control by the controller.

The temperature sensor 139 is provided inside the LED package 10 and senses the temperature of LED package 10. The driving circuit 13 changes the first reference voltage and the second reference voltage according to a temperature value sensed by the temperature sensor 139, wherein as the temperature value increases, the first reference voltage and the second reference voltage are decreased.

In the second embodiment using the heat distribution resistor, even though the form of driving the two LED chips is switched (for example, only the LED1 is driven; the LED1 and the LED2 are simultaneously driven; or the LED1, the LED2, and the heat distribution resistor are simultaneously driven), the driving circuit maintains the power of all the LEDs. In addition, the driving circuit switches the driving of the LED chips such that the LED total power (the same quantity of light) remains the same despite the change of the input voltage, and performs control such that driving is performed using the external heat distribution resistor to lower the heat of the LEDs even at a high input voltage. Accordingly, the external heat distribution resistor is heated at a high input voltage, so an increase of the temperature of the LED package is reduced.

At a low input voltage range, a basic constant current set value of the LED1 is set through an external resistor at the RS1 terminal (pin) of the LED package and the LED1 is made to be driven with a constant current (first constant current). When the input voltage increases and reaches a voltage range enabling the LED1 and the LED2 to be driven in series, a basic constant current set value of the LED1 and the LED2 is set through the external resistor at the RS2 terminal (pin) of the LED package and the LED1 and the LED2 are made to be driven in series with a constant current (second constant current).

In addition, when a higher high voltage generating high heat of the LED package is applied, the circuit including also the heat distribution resistor, that is, the LED1, the LED2, and the heat distribution resistor, is made to be driven in series with a constant current on the basis of the constant current set value (second constant current) by the RS2 terminal (pin) of the LED package. Accordingly, in a higher voltage range, in addition to the driving power of the LED1 and the LED2, the power of the heat distribution resistor is consumed, so that a wide driving range and heat stability are secured.

Figure 7:
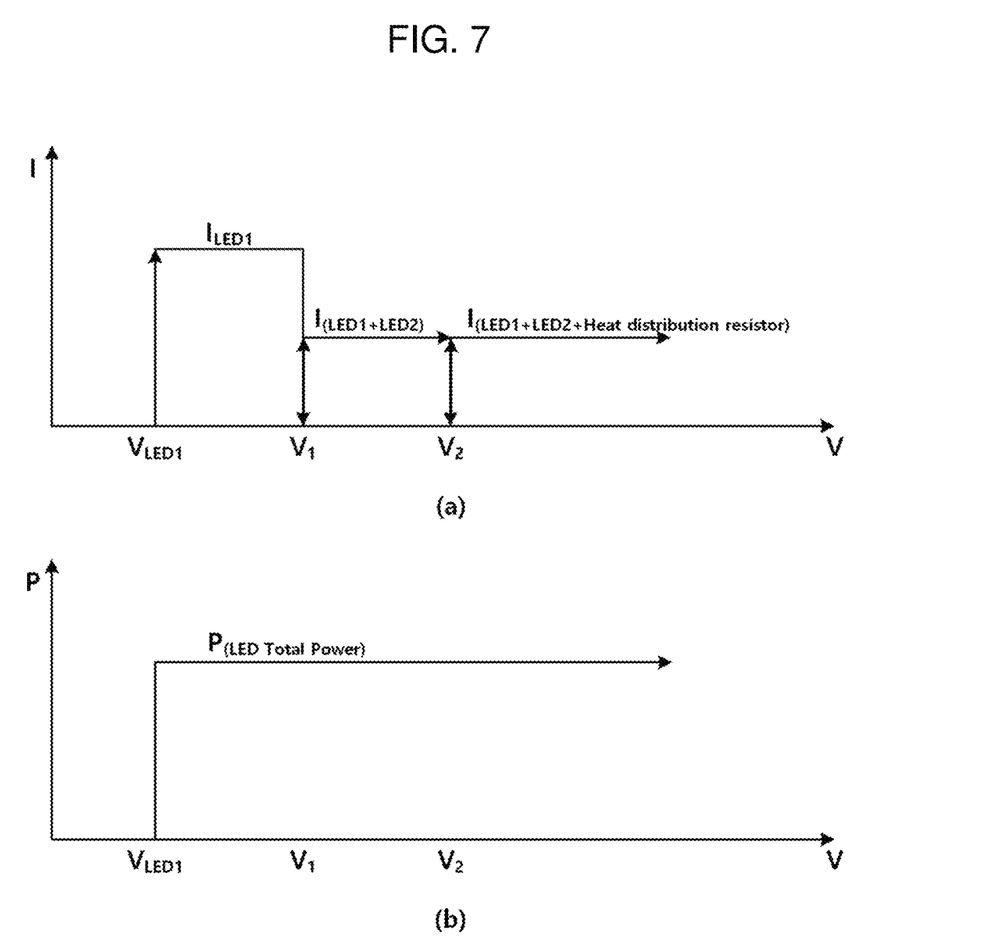

FIG. 7 illustrates graphs of electrical characteristics of an LED system for vehicle lighting according to the second embodiment of the present disclosure, wherein FIG. 7(a) illustrates the current characteristic according to the input voltage and FIG. 7(b) illustrates the power characteristic according to the input voltage.

As shown in FIG. 7, only the LED1 is driven in an LED1 driving voltage range, and when a higher voltage is applied and in a range enabling the LED1 and the LED2 to be driven, the LED1 and the LED2 are connected in series and the LED1 and the LED2 are driven. In addition, when a higher voltage causing an LED heat problem is applied, the external heat distribution resistor is also driven. That is, the LED1, the LED2, and the heat distribution resistor are driven in series with constant current.

Even though the input voltage is varied as shown in FIG. 7 as the voltage of the LED1/LED2/heat distribution resistor is detected and the constant current set value is changed, the controller makes the LED total power constant and maintains the same quantity of light, which is the most important feature. Herein, as the input voltage increases, the input power increases.

According to the second embodiment of the present disclosure, a system of a low-cost driving type using a heat distribution resistor makes an LED total power constant through the internal circuit in all the following cases: when only an LED1 inside an LED is driven; when an LED1 and an LED2 inside an LED are driven; or when an LED1, an LED2, and a heat distribution resistor are driven. In particular, in the second embodiment of the present disclosure, selective driving is possible in the form of one of the following: the LED1 is driven; the LED1 and the LED2 are driven; and the LED1, the LED2, and the heat distribution resistor are driven. Therefore, driving is possible even at a low input voltage and the driving voltage of the LED1 and the LED2 may be set to an LED Vf value enabling the maximum efficiency. Through this, it is possible to remove the driving range limitation that is the problem of a heat distribution resistor in the related art, and it is possible to realize a high reliability system having a heat problem solved by a high-efficiency characteristic.

Figure 8:
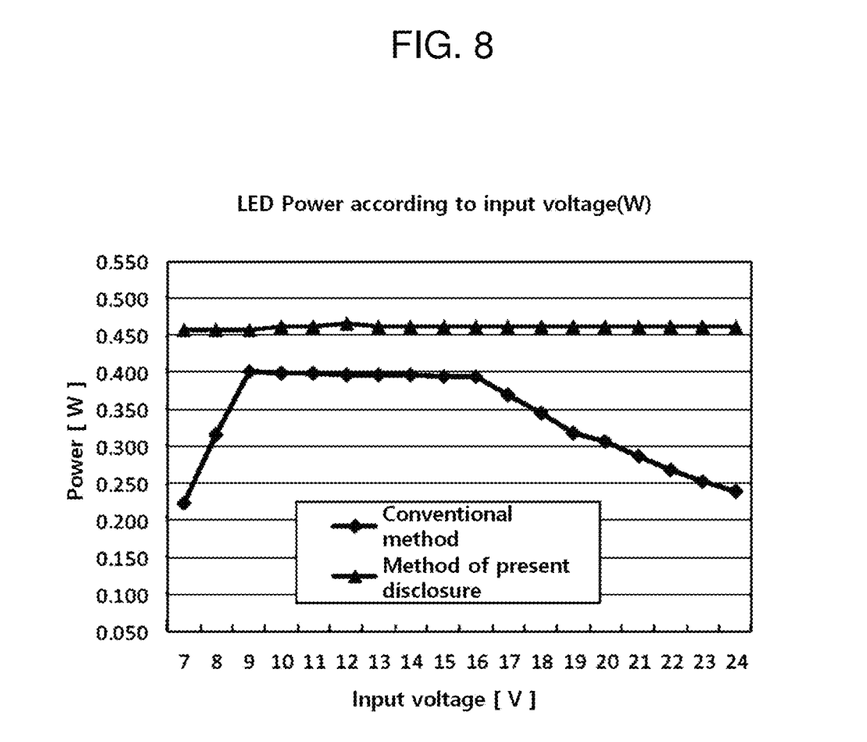
FIG. 8 is a graph illustrating a test result of comparison between the conventional driving method actually used in a vehicle and a method according to an embodiment of the present disclosure.

FIG. 8 is a graph illustrating a test result of comparison between the conventional driving method actually used in a vehicle and a method according to an embodiment of the present disclosure.

As the conventional method, adopted is a driving method that is unable to display a uniform quantity of light because an LED total power is low at a low input voltage (7 V~9 V), and that lowers the LED total power is because of a heat problem of a system at a high input voltage (16 V~24 V). In the conventional method, at the low input voltage (7 V~9 V), the voltage for displaying a uniform quantity of light is not applied to the LEDs because of the voltage applied to a heat distribution resistor, and thus at the low input voltage (7 V~9 V), the LED total power is low and a uniform quantity of light is not displayed.

If the voltage applied to the heat distribution resistor is decreased, the power applied to the driving circuit is increased according to the power formula applied to the system as shown below and a uniform quantity of light is not displayed at 16 V or higher, for example, as shown in FIG. 8.

$$P(\text{total}) = P(\text{heat distribution resistor}) + P(\text{total LED}) + P(\text{driving circuit})$$

At the high input voltage (16 V~24 V), the P (heat distribution resistor) and the P (total LED) value are constant values, so the higher the voltage, the higher the power applied to the driving circuit. For this reason, the conventional driving method adopts a driving method that lowers the maximum LED total power to be realized, or that lowers the LED total power as a voltage increases in the high voltage range as in the conventional driving method.

Therefore, due to problems with LED driving and system heat stability, constant-power LED driving needs to be given up in a low driving range, or constant-power LED driving needs to be given up in a high input voltage range, unfortunately.

Since the present disclosure is a method that is capable of realizing the same total LED power in the entire voltage range as described above, the same total LED power is realized in the entire time domain and the entire input voltage range as shown in FIG. 8.

In addition, the present disclosure can realize, with a smaller IC Package, an LED total power higher than the LED total power of the conventional driving method because of high efficiency. In addition, the temperature of the main driving IC and ambient components can be decreased, thus increasing system reliability.

In the above description of the present disclosure, the first LED chip and the second LED chip are illustrated as respective single LED elements for convenience, but the first LED chip and/or the second LED chip may be provided as multiple LED elements. Therefore, the present disclosure includes the form of providing LED chips as multiple LED elements. In addition, in the above description of the present disclosure, the LED package is illustrated as including two LED chips, but may include three or more LED chips. Such a form is included in the scope of the present disclosure. For example, in the case in which three LED chips are included, a reference voltage and a range of input voltages may be further defined.

The invention claimed is:

1. An LED system for vehicle lighting, the LED system comprising:
an LED package configured to comprise: a first LED chip and a second LED chip connected to each other in series; and a driving circuit for controlling driving of the first LED chip and the second LED chip; and
an external transistor provided outside the LED package, and connected to the first LED chip and the second LED chip through a terminal of the LED package, the external transistor having a main current channel connected to the first LED chip and the second LED chip in series,
wherein the driving circuit is configured to drive only the first LED chip with a first constant current when a level of an input voltage is lower than that of a reference voltage, or drive the first LED chip, the second LED chip, and the external transistor with a second constant current when the level of the input voltage is higher than that of the reference voltage,
wherein the driving circuit controls the first constant current and the second constant current such that power of the first LED chip when only the first LED chip is driven is the same as power of the first LED chip and the second LED chip when all the first LED chip, the second LED chip, and the external transistor connected to each other in series are driven.

2. The LED system of claim 1, further comprising:
a current sensing resistor connected to the main current channel of the external transistor in series,
wherein the driving circuit receives a voltage applied to the current sensing resistor through a terminal of the LED package, and controls a gate of the external transistor by using a result of comparing the voltage applied to the current sensing resistor and a voltage set by the driving circuit according to determination of the second constant current.

3. The LED system of claim 1, wherein the driving circuit comprises a first FET of which a drain is connected to a node to which the first LED chip and the second LED chip are connected, and of which a source is connected to ground, and
the driving circuit is configured to
control a gate of the first FET such that the first constant current flows through the first FET when the level of the input voltage is lower than that of the reference voltage, or
control the gate of the first FET such that the first FET is turned off when the level of the input voltage is higher than that of the reference voltage.

4. The LED system of claim 3, further comprising:
a current set resistor provided outside the LED package, and connected to the driving circuit through a terminal of the LED package, the current set resistor setting the first constant current.

5. The LED system of claim 4, wherein including the current set resistor, a current mirror circuit connected to the gate of the first FET is provided,
wherein the current mirror circuit receives a control voltage from a controller of the driving circuit, and controls a gate voltage of the first FET such that a mirror current of a current flowing in the current set resistor flows through the first FET.

6. The LED system of claim 1, further comprising:
a temperature sensor provided inside the LED package, and sensing a temperature of the LED package,
wherein the driving circuit changes the reference voltage according to a temperature value sensed by the temperature sensor, wherein as the temperature value increases, the reference voltage is decreased.

7. An LED system for vehicle lighting, the LED system comprising:
an LED package configured to comprise: a first LED chip and a second LED chip connected to each other in series; and a driving circuit for controlling driving of the first LED chip and the second LED chip; and
a heat distribution resistor provided outside the LED package, and having one end connected to the first LED chip and the second LED chip in series through a terminal of the LED package,
wherein the driving circuit is configured to
perform driving such that a first constant current flows in a path going through the first LED chip and to ground when a level of an input voltage is lower than that of a first reference voltage,
perform driving such that a second constant current flows in a path going through the first LED chip and the second LED chip connected to each other in series, and to the ground when the level of the input voltage is higher than that of the first reference voltage and is lower than that of a second reference voltage, or
perform driving such that the second constant current flows in a path going through the first LED chip, the second LED chip, and the heat distribution resistor connected to each other in series when the level of the input voltage is higher than that of the second reference voltage.

8. The LED system of claim 7, wherein the driving circuit performs control such that the following powers are the same: power of the first LED chip when only the first LED chip is driven; power of the first LED chip and the second LED chip when driving is performed in the path going through the first LED chip and the second LED chip connected to each other in series, and to the ground; and power of the first LED chip and the second LED chip when driving is performed in the path going through the first LED chip, the second LED chip, and the heat distribution resistor connected to each other in series.

9. The LED system of claim 8, wherein the driving circuit comprises:
a first FET of which a drain is connected to a node to which the first LED chip and the second LED chip are connected, and of which a source is connected to the ground;
a second FET of which a drain is connected to a node to which the second LED chip and the heat distribution resistor are connected, and of which a source is connected to the ground; and
a third FET of which a drain is connected to another end of the heat distribution resistor, and of which a source is connected to the ground,
wherein the driving circuit is configured to
perform control such that the first FET and the third FET are turned off and the second constant current flows through the second FET when the level of the input voltage is higher than that of the first reference voltage and is lower than that of the second reference voltage, or perform control such that the first FET and the second FET are turned off and the second constant current flows through the third FET when the level of the input voltage is higher than that of the second reference voltage.

10. The LED system of claim 9, further comprising:
a first current set resistor provided outside the LED package, and connected to the driving circuit through a terminal of the LED package, the first current set resistor setting the first constant current for the driving circuit; and
a second current set resistor provided outside the LED package, and connected to the driving circuit through a terminal of the LED package, the second current set resistor setting the second constant current for the driving circuit.

11. The LED system of claim 10, wherein including the first current set resistor, a first current mirror circuit connected to a gate of the first FET is provided,
wherein the first current mirror circuit receives a first control voltage from a controller of the driving circuit, and controls a gate voltage of the first FET such that a mirror current of a current flowing in the first current set resistor flows through the first FET.

12. The LED system of claim 7, further comprising:
a temperature sensor provided inside the LED package, and sensing a temperature of the LED package,
wherein the driving circuit changes the first reference voltage and the second reference voltage according to a temperature value sensed by the temperature sensor, wherein as the temperature value increases, the first reference voltage and the second reference voltage are decreased.

* * * * *